(12) United States Patent
Benevelli et al.

(10) Patent No.: US 10,710,417 B2
(45) Date of Patent: *Jul. 14, 2020

(54) CONTROL CIRCUIT FOR CONTROLLING THE PRESSURE OF A TIRE WHEEL

(71) Applicant: CNH Industrial America LLC, New Holland, PA (US)

(72) Inventors: Alessandro Benevelli, Albinea (IT); Riccardo Morselli, San Vito di Spilamberto (IT)

(73) Assignee: CNH Industrial America LLC, New Holland, PA (US)

(*) Notice: Subject to any disclaimer, the term of this patent is extended or adjusted under 35 U.S.C. 154(b) by 71 days.

This patent is subject to a terminal disclaimer.

(21) Appl. No.: 15/776,007

(22) PCT Filed: Nov. 10, 2016

(86) PCT No.: PCT/EP2016/077328
§ 371 (c)(1),
(2) Date: May 14, 2018

(87) PCT Pub. No.: WO2017/081191
PCT Pub. Date: May 18, 2017

(65) Prior Publication Data
US 2018/0326799 A1    Nov. 15, 2018

(30) Foreign Application Priority Data

Nov. 13, 2015 (IT) .......................... UB2015A005567

(51) Int. Cl.
*B60C 23/00* (2006.01)
*B65B 31/00* (2006.01)
(Continued)

(52) U.S. Cl.
CPC .............. *B60C 23/003* (2013.01); *B60C 5/02* (2013.01)

(58) Field of Classification Search
CPC ........... B60C 23/00; B60C 5/22; B60C 29/00; B65B 31/00; G06F 19/00
See application file for complete search history.

(56) References Cited

U.S. PATENT DOCUMENTS 3,476,168 A * 11/1969 Huber .................. B60C 29/007
                                                                    152/427
4,308,766 A *  1/1982 Myers, Jr. ............. B29C 73/166
                                                                    81/15.6

(Continued)

*Primary Examiner* — Yuri Kan
(74) *Attorney, Agent, or Firm* — Rickard K. DeMille; Rebecca L. Henkel

(57) ABSTRACT

A control circuit for controlling the pressure of a wheel enclosing a first volume and a second volume includes a controlled pressure line, a first line, connectable to the controlled pressure line and connected to the first volume for introducing air inside the first volume, and a second line, connectable to the controlled pressure line and connected to the second volume for introducing air inside the second volume. The control circuit further includes a first spool valve, which is a three way-two positions valve, having a first position in which the controlled pressure line is connected to the first line, and a second position, in which the controlled pressure line is connected to the second line. The first spool valve switches from the first position to the second position if the pressure in the first volume exceeds a predetermined pressure.

6 Claims, 2 Drawing Sheets

Figure 1:
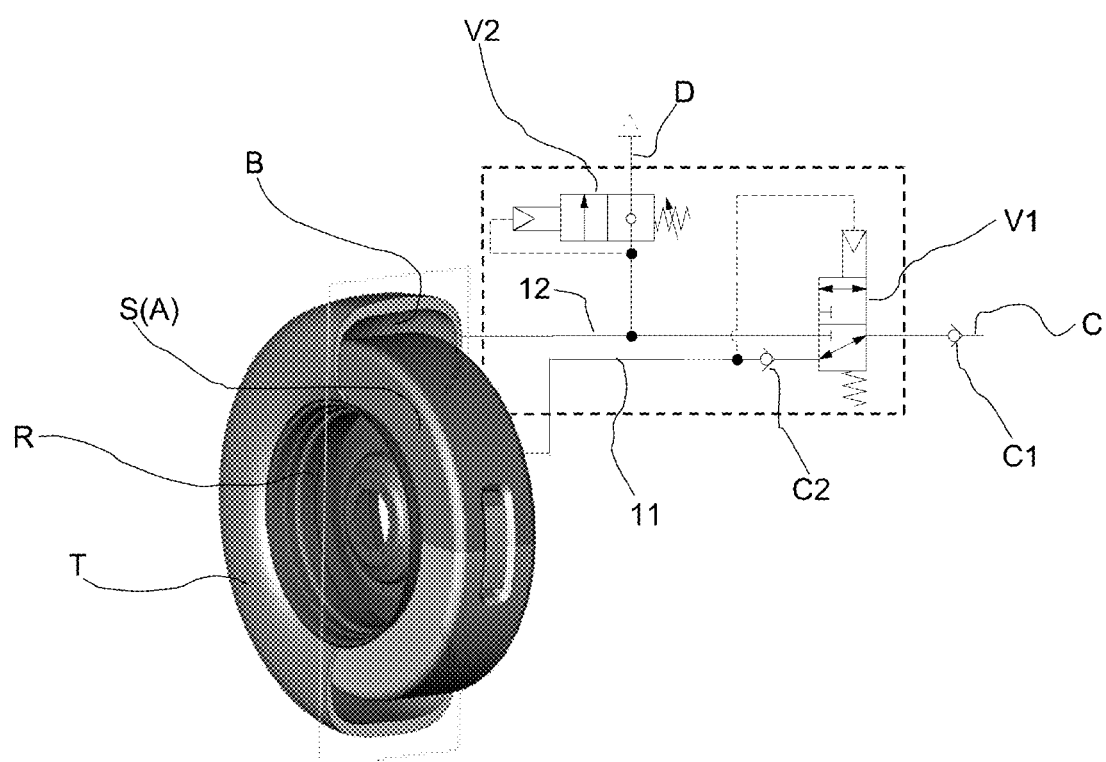

(51) Int. Cl.
  *B60C 5/22*   (2006.01)
  *G06F 19/00*  (2018.01)
  *B60C 29/00*  (2006.01)
  *B60C 5/02*   (2006.01)

(56) References Cited

U.S. PATENT DOCUMENTS

2010/0235044 A1* 9/2010 Sawada .................... B60C 5/22
                                                    701/36
2013/0153082 A1* 6/2013 Lynar ................... B60C 23/004
                                                    141/1
2016/0207355 A1* 7/2016 Geddis ..................... B60C 5/22
2019/0054779 A1* 2/2019 Benevelli ................. B60C 5/22

* cited by examiner

CONTROL CIRCUIT FOR CONTROLLING THE PRESSURE OF A TIRE WHEEL

CROSS REFERENCE TO RELATED APPLICATIONS

This application is a US National Stage filing of International Application Serial No. PCT/EP2016/077328 entitled "A CONTROL CIRCUIT FOR CONTROLLING THE PRESSURE OF A TIRE WHEEL," filed Nov. 10, 2016, which claims priority to Italian Application Serial No. UB2015A005567, filed Nov. 13, 2015, each of which is incorporated by reference herein in its entirety for all purposes.

The invention relates to a control circuit for controlling the pressure of a tire wheel.

The invention is particularly useful in operating machines and tractors which may perform field operations and road operations.

During field operations a lower tire pressure is preferred, while during road operations and travelling a higher tire pressure is preferred to improve comfort for the driver and to reduce the fuel consumption.

In order to reduce the inflation/deflation times, some wheels are available which comprise an inner tube, enclosing a dummy volume, attached to the rim inside the tire. The inner tube is normally inflated and kept at a high pressure. The volume inside the tire and external to the inner tube is instead inflated/deflated in order to increase/decrease the tire pressure. In this way only a limited volume, much smaller than the overall volume enclosed by the tire, has to be inflated/deflated, so that the time required for both operations is sensibly reduced.

The available wheels are controlled by means of several circuits comprising at least a line for inflating/deflating the inner tube and at least a separate line for inflating/deflating the tire volume. Such circuits are very complex and difficult to manage, and furthermore require the adoption of complex rotating joints which must consent the air feeding of both lines. Another drawback of available wheels and control circuits is that they are extremely difficult to be adopted on existing machines which were not specifically designed.

The aim of the present invention is to provide a control circuit which consent the management of the tire pressure of a wheel in a simple and effective manner.

An advantage of the circuit according to the invention is that it requires a single feeding line.

Another advantage of the circuit according to the invention is that it does not require any kind of electrical/electronic control.

A further advantage of the circuit according to the invention is that it can be adopted almost on every existing machine.

Figure 2:
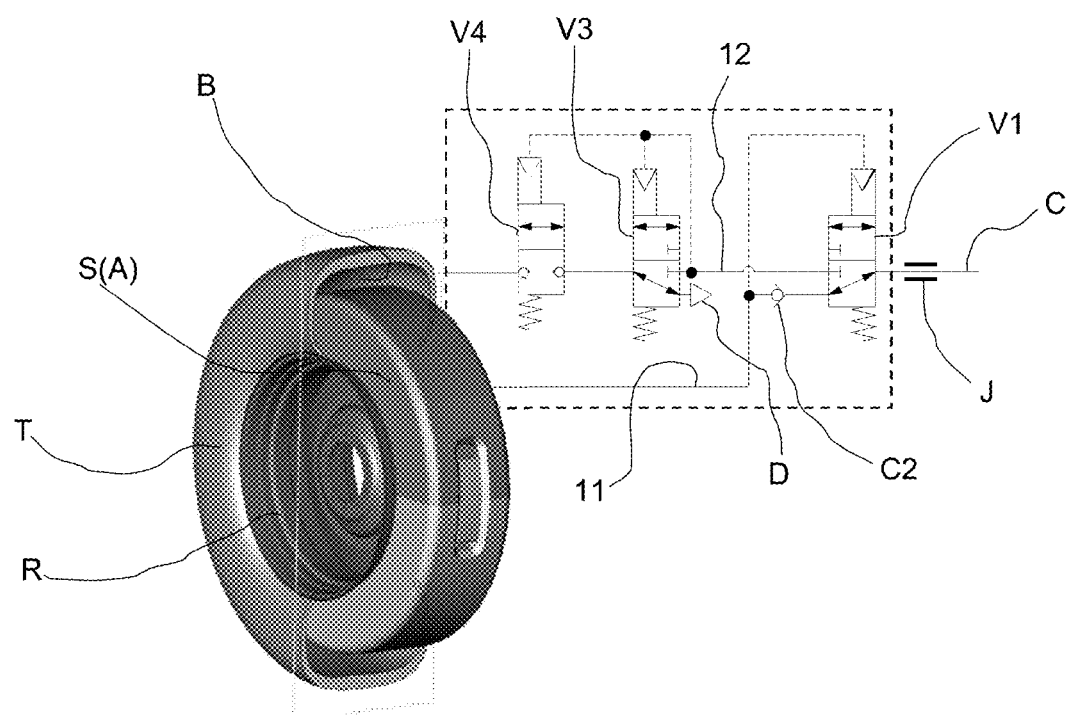

Further features and advantages of the invention will better emerge from the following description and figures of two preferred but not exclusive embodiments of the invention, wherein:

FIG. 1 discloses a first embodiment of the circuit according to the invention;

FIG. 2 discloses a second embodiment of the circuit according to the invention.

With reference to FIG. 1, the control circuit is connected to a tire wheel comprising a rim (R). An inner tube (S), which encloses a first volume (A), is fixable to the rim (R) permanently or by means of a shape joint which arise on inflation of the inner tube (S). A tire (T) is fixed to the rim (R) as well, which encloses the inner tube (A) and a second volume (B) external to the inner tube (A).

Advantageously the inner tube (S) is made of fabric, for example the fabric used for air-bags. In this way the inner tube is flexible but substantially inextensible, and it can be designed in order to assume a desired shape when inflated at the maximum pressure. Preferably the inner tube is designed so as not to completely fill the tire (T) volume, in order to leave the thread of the tire (T) free to deform under working conditions.

It is possible to provide a rigid structure which covers the inner tube (S), in order to make the inner tube (S) substantially inextensible.

The control circuit comprises a controlled pressure line (C), connectable to a compressor or in general to a source of compressed air, for example the compressor normally on board to the operating machines.

A first line (11) is connectable to the controlled pressure line (C) and is connected to the first volume (A) for introducing air inside the first volume (A).

A second line (12) is connectable to the controlled pressure line (C) and is connected to the second volume (B) for introducing air inside the second volume (B).

The control circuit further comprises a first spool valve (V1), which is a three way-two positions valve, having a first position in which the controlled pressure line (C) is connected to the first line (11), and a second position, in which the controlled pressure line (C) is connected to the second line (12).

The first spool valve (V1) is normally kept in the first position.

The first spool valve (V2) is switchable in the second position if the pressure in the first volume (A) overcomes a predetermined pressure.

The adoption of the first spool valve (V1) allows the separate inflating of the first volume (A) and of the second volume (B) by way of a single controlled pressure line (C). This single controlled pressure line (C) could by the inflating valve of the common wheels, i.e. the wheels which are inflated by means of devices not part of the machine or tractor, or a line connected to the tire pressure control system, if the machine or tractor is so provided.

The embodiment of FIG. 1 works as follows.

The first spool valve (V1) is normally open, i.e. is kept in the first position by means, for example, of a spring. In this condition, the supply of air to the controlled pressure line (C) inflates the first volume (A) through the first line (11). When the pressure inside the first volume (A) reaches a predetermined value, sufficient to overcome the force which keeps the spool in the first position, the first spool valve (V1) switches in the second position and the controlled pressure line (C) is placed in communication with the second line (12), so that the second volume (B) is inflated. Preferably the first spool valve (V1) is piloted in the second position by the pressure inside the first line (11).

Advantageously an outlet spool valve (V2) is connected to the second line (12) and to an outlet line (D). The outlet spool valve (V2) is a two way-two position valve and has a first position, in which it closes a connection between the second line (12) and the outlet line (D), and a second position, in which it opens a connection between the second line (12) and the outlet line (D). Said outlet spool valve (V2) is normally kept in the first position, for example by means of a spring. The outlet spool valve (V2) is switchable in the second position if the pressure in the second volume (B) overcomes a predetermined pressure.

The function of the outlet spool valve (V2) is the following.

When the pressure inside the second volume (B) reaches a predetermined value, sufficient to overcome the force which keeps the spool in the first position, the outlet spool valve (V2) switches in the second position. In these condition the second line (12) is placed in communication with the outlet line (D) and the inflating of the second volume (B) ceases. Preferably the outlet spool valve is piloted in the second position by the pressure in the second line (12).

Preferably the outlet spool valve (V2) is provided with adjusting means which allow to regulate the pressure requested to switch the spool from the first to the second position. Preferably said adjusting means comprise a screw acting on a spring which pushes the spool towards the first position. In this way, in order to deflate the second volume (B) it is sufficient to act on the adjusting means and reduce the pressure requested to switch the spool from the first to the second position.

The control circuit may be provided with at least a first check valve (C1), placed along the controlled pressure line (C) for preventing backflow from the first spool valve (V1), and/or a second check valve (C2), placed along the first line (11) for preventing backflow from the first volume (A).

In the second embodiment, shown in FIG. 2, the control circuit comprises a second spool valve (V3), placed along the second line (12) between the first spool valve (V1) and the second volume (B), and a third spool valve (V4), placed along the second line (12) between the second spool valve (V3) and the second volume (B).

The second spool valve (V3) is a three way-two positions valve having a first position, in which connects the second volume (B) to an outlet line (D), and a second position, in which connects the second line (12) to the second volume (B).

The third spool valve (V4) is a two way-two positions valve having a first position, in which it closes the second line (12), and a second position, in which it opens the second line (12).

Both the second and third spool valve are normally kept in their first position.

The third spool valve (V4) is switchable in the second position in the pressure inside the second line (12) overcomes e first predetermined pressure.

The second spool valve (V3) is switchable in the second position if the pressure inside the second line (12) overcomes a second predetermined pressure higher than said first predetermined pressure.

The control circuit of the second embodiment works as follows.

With all the spool valves (V1,V3,V4) in their first position, feeding air to the controlled pressure line (C) inflates the inner tube (S) through the first line (11). When the pressure inside the inner tube (S) reaches a predetermined value, i.e. the desired inflate pressure, the first spool valve (V1) switches in the second position, placing in communication the controlled pressure line (C) with the second line (12). Also in this case the first spool valve (V1) is piloted in the second position by the pressure inside the first line (11). Preferably both the second and third spool valve are piloted in their second position by the pressure inside the second line (12) between the first spool valve (V1) and the second spool valve (V1).

With the second spool valve (V3) in the second position, the pressure inside the second line (12) increases. When this pressure overcome the first predetermined pressure value, the third spool valve (V4) switches in the second position. The pressure inside the second line (12) continues to increase and, when the second predetermined pressure is reached, also the second spool valve (V3) switches in the second positions.

With both the second and third spool valve (V3,V4) in their second position, the second volume (B) is fed with air through the second line and the tire (T) inflates.

When the pressure inside the tire (T) reaches a desired value, measured by means of a pressure sensor not depicted in FIG. 2, the air feeding is stopped and the second and third spool valves (V3,V4) switch in their first position, closing the second volume (B). The first spool valve (V1) is kept in the second position by the pressure inside the inner tube (S), but the inner tube (S) cannot deflate anyway owing to the presence of a check valve (C2) on the first line (11). How is it possible to deflate the inner tube?

In the above conditions, with the first spool valve in second position and the second and third spool valve (V3, V4) in first position, if air is fed to the controlled pressure line (C) at a pressure higher than the first predetermined pressure but lower than the second predetermined pressure, the third spool valve (V4) switches in the second position, while the second spool valve (V3) remains in the first positions. In these conditions the second volume (B) is placed in communication with the outlet line (D) and the tire deflates. Therefore, in the second embodiment of the invention not only the inflate is possible through a single controlled pressure line (C), but also the deflate of the tire (T) is possible through the same controlled pressure line (C) by means a suitable pressure.

The control circuit of the second embodiment is particularly advantageous in combination with a tire pressure monitoring system which is available in some operating machines. As known in the technical filed, such monitoring system comprises a pressure sensor for each wheel of the operating machine, fitted to detect the pressure inside the respective tire, and a rotating sealing joint for each wheel. Each rotating sealing joint is normally provided in the hub of a wheel and it is design to allow the wheel to rotate an to place in communication the inner volume of the tire with an air feeding line, on its turn connected to a compressor on board to the operating machine. A control unit commands the inflate or deflate of each single tire on the basis of the operating conditions and of the signal of each pressure sensor.

The control circuit of the second embodiment can be attached to the rim (R) and interposed between the rotating joint and the first and second volume (A,B). The rotating joint can therefore be designed to provide a single controlled pressure line.

Furthermore, as already explained, no additional electric/electronic components have to be installed for actuating the control circuit.

The invention claimed is:

1. A control circuit for controlling a pressure of a tire wheel comprising a rim, an inner tube that encloses a first volume, a tire fixed to the rim that encloses the inner tube and a second volume external to the inner tube, the control circuit comprising:

a controlled pressure line, connectable to a compressor;
a first line, connectable to the controlled pressure line and connected to the first volume for introducing air inside the first volume;
a second line, connectable to the controlled pressure line and connected to the second volume for introducing air inside the second volume;

a first spool valve, which is a three way-two positions valve, having a first position in which the controlled pressure line is connected to the first line, and a second position, in which the controlled pressure line is connected to the second line, wherein the first spool valve is configured to switch from the first position to the second position if a pressure in the first volume exceeds a predetermined pressure.

2. The control circuit of claim 1, further comprising:
a second spool valve, positioned along the second line between the first spool valve and the second volume, wherein the second spool valve is a three way-two positions valve having a first position configured to connect the second volume to an outlet line, and a second position, in which connects the second line to the second volume.

3. The control circuit of claim 2, further comprising:
a third spool valve, positioned along the second line between the second spool valve and the second volume, wherein the third spool valve is a two way-two positions valve having a first position, in which it closes the second line, and a second position, in which it opens the second line, and
wherein the third spool valve is configured to switch from the first position of the third spool valve to the second position of the third spool valve if a pressure inside the second line exceeds a first predetermined pressure, and
wherein the second spool valve is configured to switch from the first position of the second spool valve to the second position of the second spool valve if the pressure inside the second line exceeds a second predetermined pressure that is greater than the first predetermined pressure.

4. The control circuit of claim 1, wherein the first spool valve is piloted in the second position by the pressure inside the first line.

5. The control circuit of claim 3, wherein both the second and third spool valve are piloted in their second position by the pressure inside the second line between the first spool valve and the second spool valve.

6. A Wheel, comprising:
a rim;
an inner tube, which encloses a first volume;
a tire, fixed to the rim, which encloses the inner tube and a second volume external to the inner tube;
a rotating sealing joint, connected to the rim and connectable to a vehicle axis, configured to introduce air in said first and second volume; and
a control circuit connected to the rim and interposed between the rotating sealing joint and said first and second volume, the control circuit comprising:
a controlled pressure line, connectable to a compressor;
a first line, connectable to the controlled pressure line and connected to the first volume for introducing air inside the first volume;
a second line, connectable to the controlled pressure line and connected to the second volume for introducing air inside the second volume;
a first spool valve, which is a three way-two positions valve, having a first position in which the controlled pressure line is connected to the first line, and a second position, in which the controlled pressure line is connected to the second line, wherein the first spool valve is configured to switch from the first position to the second position if a pressure in the first volume exceeds a predetermined pressure.

* * * * *